United States Patent
Edmonston et al.

(10) Patent No.: US 12,506,169 B2
(45) Date of Patent: Dec. 23, 2025

(54) FUEL PLENUM AND FUEL CELL STACK INCLUDING SAME

(71) Applicant: BLOOM ENERGY CORPORATION, San Jose, CA (US)

(72) Inventors: David Edmonston, Santa Cruz, CA (US); Michael Petrucha, Santa Clara, CA (US); Martin Perry, Mountain View, CA (US); Matthias Gottmann, Malpitas, CA (US); Victor Silva, Denver, CO (US); Joshua Baime, Kensington, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 721 days.

(21) Appl. No.: 17/804,913

(22) Filed: Jun. 1, 2022

(65) Prior Publication Data
US 2022/0393219 A1 Dec. 8, 2022

Related U.S. Application Data

(60) Provisional application No. 63/208,178, filed on Jun. 8, 2021.

(51) Int. Cl.
*H01M 8/2483* (2016.01)
*H01M 8/0258* (2016.01)
(Continued)

(52) U.S. Cl.
CPC ....... *H01M 8/2483* (2016.02); *H01M 8/0258* (2013.01); *H01M 8/0273* (2013.01); *H01M 8/0282* (2013.01); *H01M 8/2485* (2013.01)

(58) Field of Classification Search
CPC ............. H01M 8/2483; H01M 8/0258; H01M 8/0273; H01M 8/0282; H01M 8/2485;
(Continued)

(56) References Cited

U.S. PATENT DOCUMENTS

| | | | |
|---|---|---|---|
| 5,399,442 A | | 3/1995 | Shundo et al. |
| 5,514,487 A | * | 5/1996 | Washington ...... H01M 8/04074 |
| | | | 429/461 |

(Continued)

FOREIGN PATENT DOCUMENTS

| | | |
|---|---|---|
| EP | 4135082 A1 | 2/2023 |
| JP | H06111829 A | 4/1994 |

(Continued)

OTHER PUBLICATIONS

U.S. Appl. No. 63/020,074, filed May 5, 2020, Bloom Energy Corp.

(Continued)

*Primary Examiner* — Helen Oi K Conley
(74) *Attorney, Agent, or Firm* — THE MARBURY LAW GROUP PLLC

(57) ABSTRACT

A fuel cell stack fuel plenum includes a base plate including an inlet hole and an outlet hole, a dielectric layer disposed on the base plate and including an inlet hole and an outlet hole, a cover plate disposed on the dielectric layer and including an inlet hole and an outlet hole, a seal plate disposed on the cover plate and including an inlet hole and an outlet hole, and a manifold plate disposed on the seal plate. The manifold plate includes a bottom inlet hole and a bottom outlet hole formed in a bottom surface of the manifold plate, top outlet holes and top inlet holes formed in opposing sides of a top surface of the manifold plate, outlet channels fluidly connecting the top outlet holes to the bottom inlet hole, and inlet channels fluidly connecting the top inlet holes to the bottom outlet hole.

22 Claims, 10 Drawing Sheets

(51) Int. Cl.
*H01M 8/0273* (2016.01)
*H01M 8/0282* (2016.01)
*H01M 8/2485* (2016.01)

(58) Field of Classification Search
CPC ............. H01M 8/0215; H01M 8/0228; H01M 8/0232; H01M 8/0247; H01M 8/0271; H01M 8/0276; H01M 8/0286; H01M 8/04089; H01M 8/04201; H01M 8/1246; H01M 8/2425; H01M 8/2432; H01M 8/2465; H01M 8/2484; H01M 2008/1293; Y02E 60/50
See application file for complete search history.

(56) References Cited

U.S. PATENT DOCUMENTS

| | | |
|---|---|---|
| 10,211,478 B2 | 2/2019 | Armstrong et al. |
| 2007/0281194 A1 | 12/2007 | Cortright et al. |
| 2011/0053019 A1 | 3/2011 | Takahashi |
| 2014/0087286 A1 | 3/2014 | Fisher et al. |
| 2014/0147766 A1* | 5/2014 | Huynh ................ H01M 8/2425 429/456 |
| 2015/0050577 A1 | 2/2015 | Numao et al. |
| 2016/0344057 A1 | 11/2016 | Noponen |
| 2017/0104233 A1 | 4/2017 | Armstrong et al. |
| 2019/0372132 A1 | 12/2019 | Gasda et al. |
| 2020/0381762 A1 | 12/2020 | Edmonston et al. |

FOREIGN PATENT DOCUMENTS

| | | |
|---|---|---|
| JP | 2009087539 A | 4/2009 |
| JP | 2011198758 A | 10/2011 |
| JP | 2014501437 A | 1/2014 |
| JP | 2015084281 A | 4/2015 |
| JP | 2022156878 A | 10/2022 |
| WO | WO 2008/050816 A1 | 5/2008 |
| WO | WO 2017/191353 A1 | 11/2017 |

OTHER PUBLICATIONS

European Office Communication, extended search report from the European Patent Office (EPO) for European Patent Application 22176637.1, mailed Jan. 18, 2023, 6 pages.

JPO Office Communication, 3rd Party Observation for Japanese Patent Application No. 2022-089574, mailed May 7, 2025, 4 pages, with partial English-language translation.

EPO Office Communication, Communication of a Notice of Opposition for European Patent Application No. 22176637.1, dated Jun. 10, 2025, 27 pages.

JPO Office Communication, 3rd Party Observation for Japanese Patent Application No. 2022-094029, mailed Oct. 3, 2025, 23 pages.

* cited by examiner

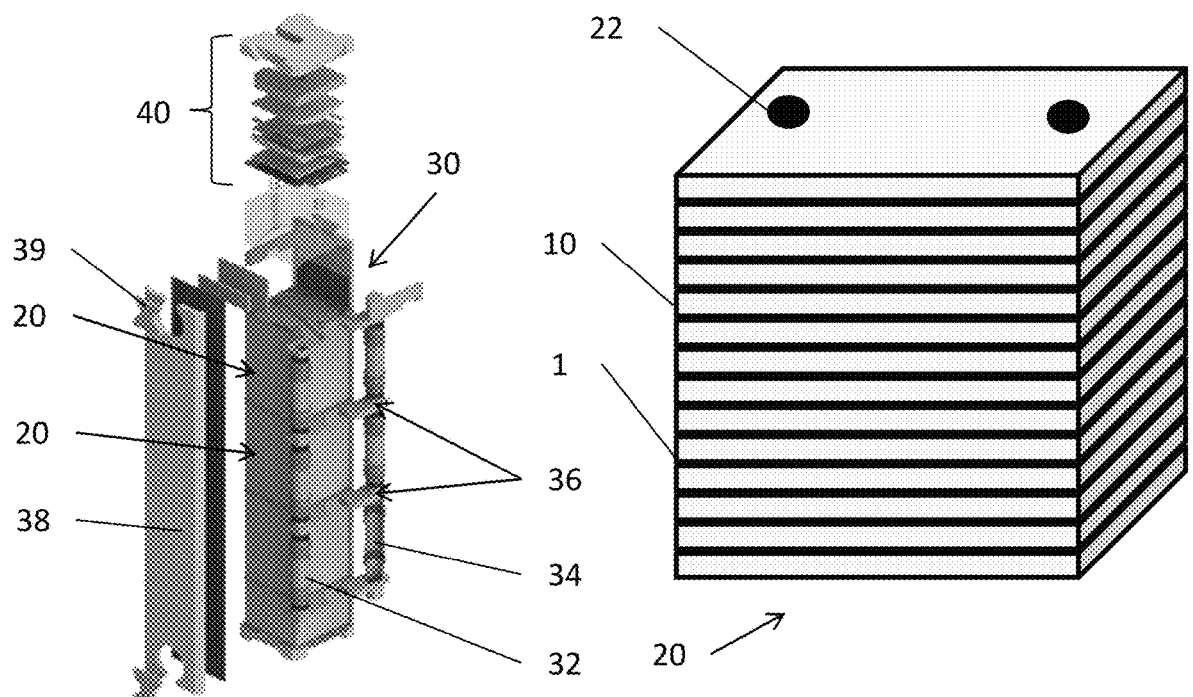
FIG. 1A
(Related Art)
FIG. 1B
(Related Art)
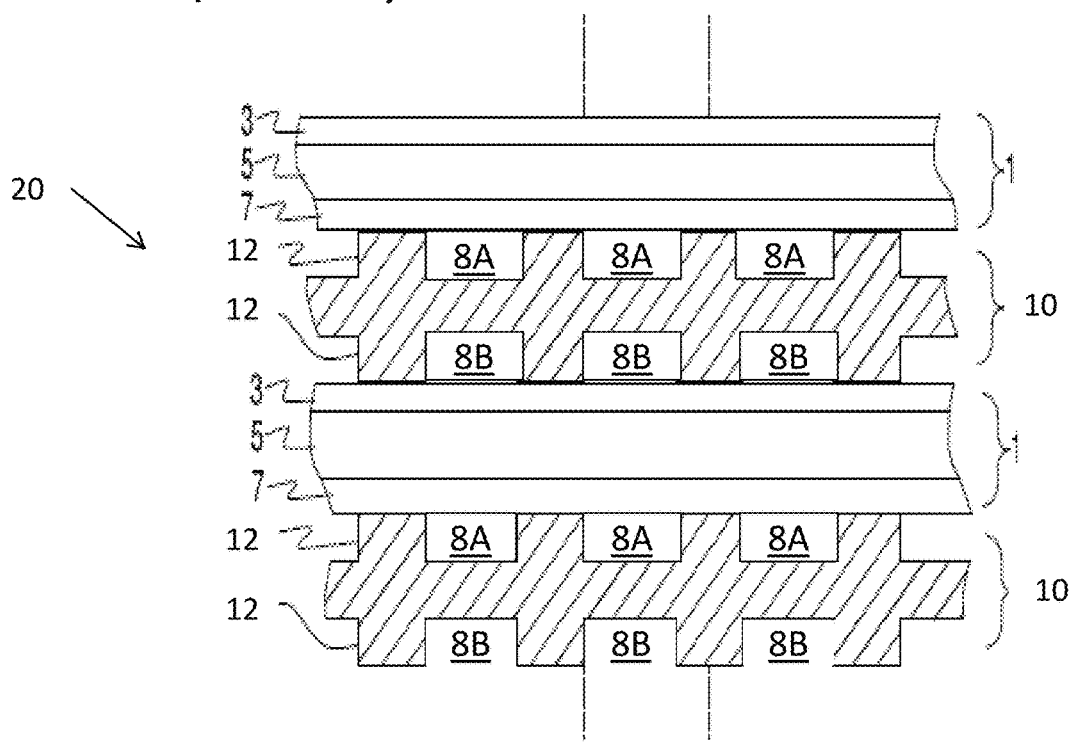
FIG. 1C
(Related Art)

FUEL PLENUM AND FUEL CELL STACK INCLUDING SAME

FIELD

The present disclosure is directed to fuel cell stacks in general, and to fuel plenums for fuel cell stacks including the same in particular.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air are distributed to each cell using risers contained within the stack. In other words, the gas flows through openings or holes in the supporting layer of each fuel cell, such as the electrolyte layer, and gas flow separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air have to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

According to various embodiments of the present disclosure, provided is a fuel cell stack fuel flow structure comprising a fuel plenum comprising: a base plate comprising an inlet hole and an outlet hole; a dielectric layer disposed on the base plate and comprising an inlet hole and an outlet hole; a cover plate disposed on the dielectric layer and comprising an inlet hole and an outlet hole; a seal plate disposed on the cover plate and comprising an inlet hole and an outlet hole; and a manifold plate disposed on the seal plate and comprising: a bottom inlet hole and a bottom outlet hole, formed in a bottom surface of the manifold plate; top outlet holes and top inlet holes, formed in opposing sides of a top surface of the manifold plate; outlet channels fluidly connecting the top outlet holes to the bottom inlet hole; and inlet channels fluidly connecting the top inlet holes to the bottom outlet hole. The inlet holes of the base plate, cover plate, seal plate and manifold plate are aligned to form an inlet conduit passage, and the outlet holes of the base plate, cover plate, seal plate and manifold plate are aligned to form an outlet conduit passage.

According to various embodiments of the present disclosure, provided is a fuel cell stack including the fuel plenum, cross-flow interconnects stacked on the fuel plenum; and solid oxide fuel cells disposed between the interconnects.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 1A is a perspective view of a conventional fuel cell column, FIG. 1B is a perspective view of one counter-flow solid oxide fuel cell (SOFC) stack included in the column of FIG. 1A, and FIG. 1C is a side cross-sectional view of a portion of the stack of FIG. 1B.

DETAILED DESCRIPTION

Figure 2A:
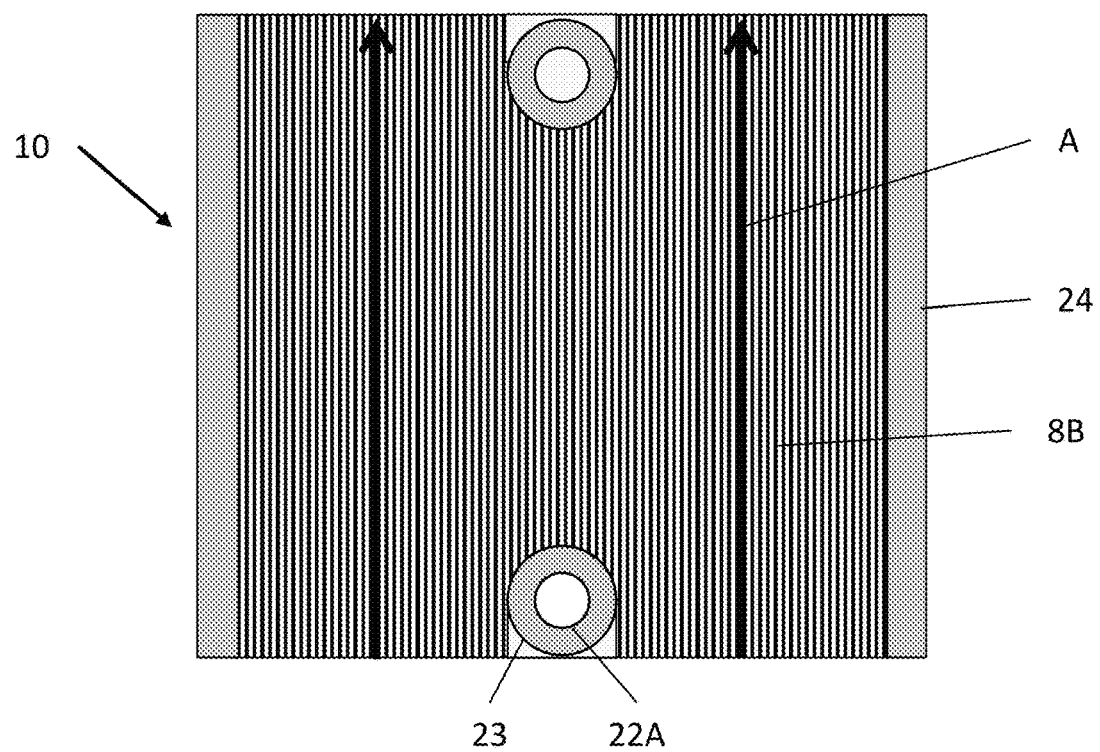
FIG. 2A is a top view of the air side of a conventional interconnect of the stack of FIG. 1B.

The various embodiments will be described in detail with reference to the accompanying drawings. The drawings are not necessarily to scale, and are intended to illustrate various features of the invention. Wherever possible, the same reference numbers will be used throughout the drawings to refer to the same or like parts. References made to particular examples and implementations are for illustrative purposes, and are not intended to limit the scope of the invention or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

FIG. 1A is a perspective view of a conventional fuel cell column 30, FIG. 1B is a perspective view of one counter-flow solid oxide fuel cell (SOFC) stack 20 included in the column 30 of FIG. 1A, and FIG. 1C is a side cross-sectional view of a portion of the stack 20 of FIG. 1B.

Referring to FIGS. 1A and 1B, the column 30 may include one or more stacks 20, a fuel inlet conduit 32, an anode exhaust conduit 34, and anode feed/return assemblies 36 (e.g., anode splitter plates (ASP's) 36). The column 30 may also include side baffles 38 and a compression assembly 40. The side baffles 38 may be connected to the compression assembly 40 and an underlying stack component (not shown) by ceramic connectors 39. The fuel inlet conduit 32 is fluidly connected to the ASP's 36 and is configured to provide the fuel feed to each ASP 36, and anode exhaust conduit 34 is fluidly connected to the ASP's 36 and is configured to receive anode fuel exhaust from each ASP 36.

The ASP's 36 are disposed between the stacks 20 and are configured to provide a hydrocarbon fuel containing fuel feed to the stacks 20 and to receive anode fuel exhaust from the stacks 20. For example, the ASP's 36 may be fluidly connected to internal fuel riser channels 22 formed in the stacks 20, as discussed below.

Referring to FIG. 1C, the stack 20 includes multiple fuel cells 1 that are separated by interconnects 10, which may also be referred to as gas flow separator plates or bipolar plates. Each fuel cell 1 includes a cathode electrode 3, a solid oxide electrolyte 5, and an anode electrode 7.

Each interconnect 10 electrically connects adjacent fuel cells 1 in the stack 20. In particular, an interconnect 10 may electrically connect the anode electrode 7 of one fuel cell 1 to the cathode electrode 3 of an adjacent fuel cell 1. FIG. 1C shows that the lower fuel cell 1 is located between two interconnects 10.

Each interconnect 10 includes ribs 12 that at least partially define fuel channels 8A and air channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 20, there may be an air end plate or fuel end plate (not shown) for providing air or fuel, respectively, to the end electrode.

Figure 2B:
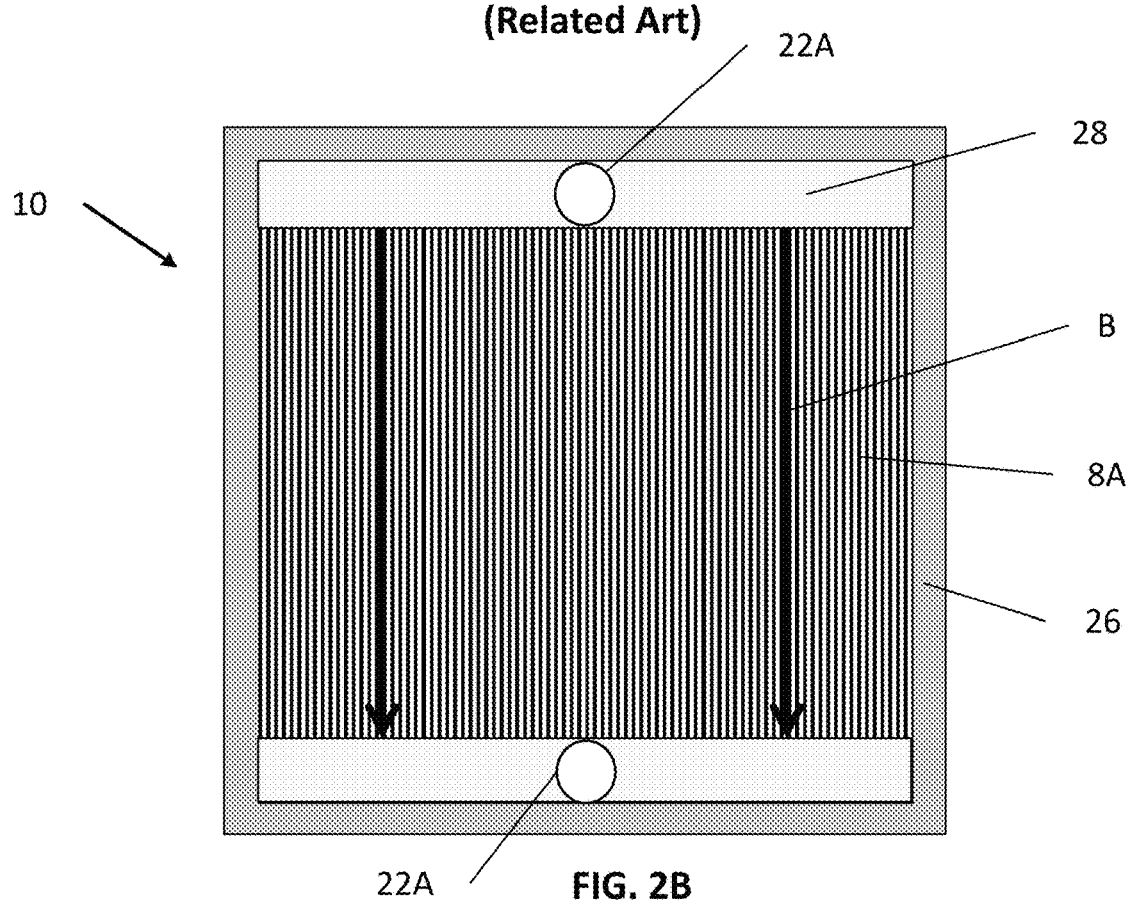
FIG. 2B is a top view of the fuel side of the conventional interconnect.

FIG. 2A is a top view of the air side of the conventional interconnect 10, and FIG. 2B is a top view of a fuel side of the interconnect 10. Referring to FIGS. 1C and 2A, the air side includes the air channels 8B. Air flows through the air channels 8B to a cathode electrode 3 of an adjacent fuel cell 1. In particular, the air may flow across the interconnect 10 in a first direction A as indicated by the arrows.

Ring seals 23 may surround fuel holes 22A of the interconnect 10, to prevent fuel from contacting the cathode electrode. Peripheral strip-shaped seals 24 are located on peripheral portions of the air side of the interconnect 10. The seals 23, 24 may be formed of a glass material. The peripheral portions may be in the form of an elevated plateau which does not include ribs or channels. The surface of the peripheral regions may be coplanar with tops of the ribs 12.

Referring to FIGS. 1C and 2B, the fuel side of the interconnect 10 may include the fuel channels 8A and fuel manifolds 28 (e.g., fuel plenums). Fuel flows from one of the fuel holes 22A, into the adjacent manifold 28, through the fuel channels 8A, and to an anode 7 of an adjacent fuel cell 1. Excess fuel may flow into the other fuel manifold 28 and then into the adjacent fuel hole 22A. In particular, the fuel may flow across the interconnect 10 in a second direction B, as indicated by the arrows. The second direction B may be perpendicular to the first direction A (see FIG. 2A).

A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

Accordingly, a conventional counter-flow fuel cell column, as shown in FIGS. 1A, 1B, 1C, 2A, and 2B, may include complex fuel distribution systems (fuel rails and anode splitter plates). In addition, the use of an internal fuel riser may require holes in fuel cells and corresponding seals, which may reduce an active area thereof and may cause cracks in the ceramic electrolytes of the fuel cells 1.

The fuel manifolds 28 may occupy a relatively large region of the interconnect 10, which may reduce the contact area between the interconnect 10 and an adjacent fuel cell by approximately 10%. The fuel manifolds 28 are also relatively deep, such that the fuel manifolds 28 represent relatively thin regions of the interconnect 10. Since the interconnect 10 is generally formed by a powder metallurgy compaction process, the density of fuel manifold regions may approach the theoretical density limit of the interconnect material. As such, the length of stroke of a compaction press used in the compaction process may be limited due to the high-density fuel manifold regions being incapable of being compacted further. As a result, the density achieved elsewhere in the interconnect 10 may be limited to a lower level by the limitation to the compaction stroke. The resultant density variation may lead to topographical variations, which may reduce the amount of contact between the interconnect 10 a fuel cell 1 and may result in lower stack yield and/or performance.

Another important consideration in fuel cell system design is in the area of operational efficiency. Maximizing fuel utilization is a key factor to achieving operational efficiency. Fuel utilization is the ratio of how much fuel is consumed during operation, relative to how much is delivered to a fuel cell. An important factor in preserving fuel cell cycle life may be avoiding fuel starvation in fuel cell active areas, by appropriately distributing fuel to the active areas. If there is a maldistribution of fuel such that some flow field channels receive insufficient fuel to support the electrochemical reaction that would occur in the region of that channel, it may result in fuel starvation in fuel cell areas adjacent that channel. In order to distribute fuel more uniformly, conventional interconnect designs include channel depth variations across the flow field. This may create complications not only in the manufacturing process, but may also require complex metrology to measure these dimensions accurately. The varying channel geometry may be constrained by the way fuel is distributed through fuel holes and distribution manifolds.

One possible solution to eliminate this complicated geometry and the fuel manifold is to have a wider fuel opening to ensure much more uniform fuel distribution across the fuel flow field. Since fuel manifold formation is a factor in density variation, elimination of fuel manifolds should enable more uniform interconnect density and permeability. Accordingly, there is a need for improved interconnects that provide for uniform contact with fuel cells, while also uniformly distributing fuel to the fuel cells without the use of conventional fuel manifolds.

Owing to the overall restrictions in expanding the size of a hotbox of a fuel cell system, there is also a need for improved interconnects designed to maximize fuel utilization and fuel cell active area, without increasing the footprint of a hotbox.

Cross-Flow Fuel Cell Systems

Figure 3A:
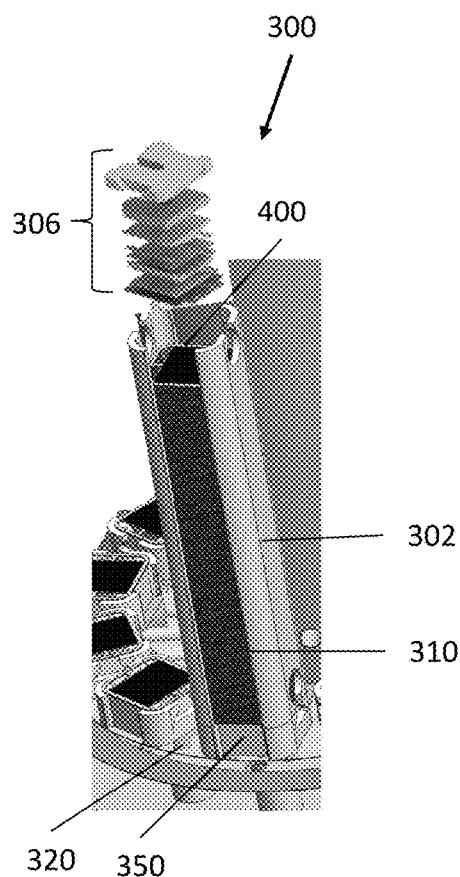
FIG. 3A is a perspective view of a fuel cell stack, according to various embodiments of the present disclosure.
Figure 3D:
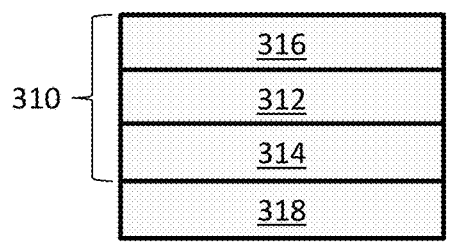
FIG. 3D is a schematic view of a fuel cell included in the stack of FIG. 3A.
Figure 3C:
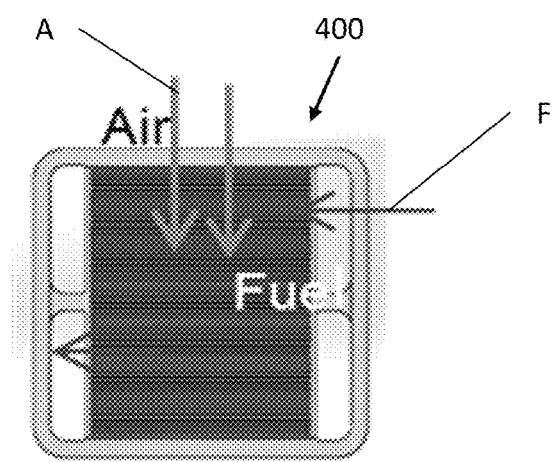
FIG. 3C is a top view of the fuel side of an interconnect included in the stack of FIG. 3A.
Figure 3B:
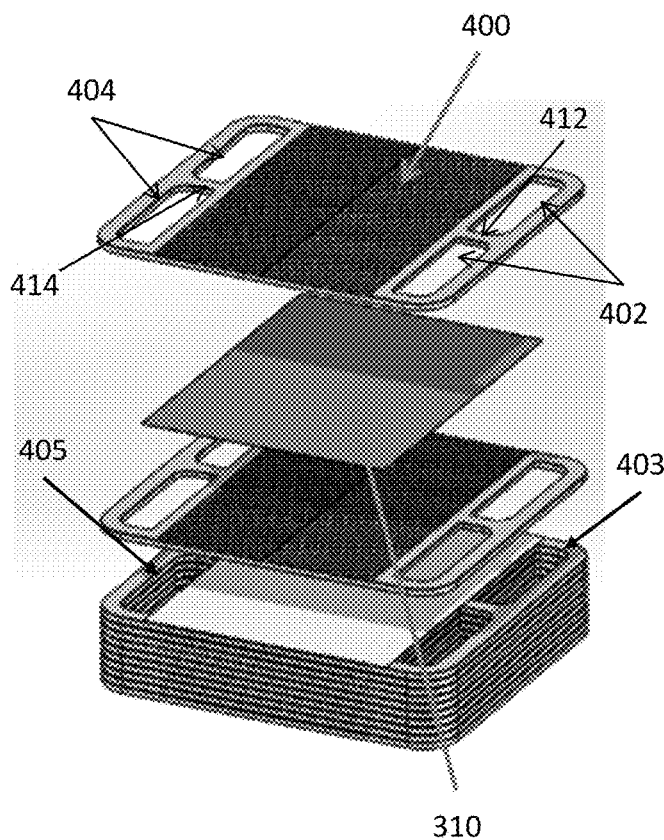
FIG. 3B is an exploded perspective view of a portion of the stack of FIG. 3A.

FIG. 3A is a perspective view of a fuel cell stack 300, according to various embodiments of the present disclosure, FIG. 3B is an exploded perspective view of a portion of the stack 300 of FIG. 3A, FIG. 3C is a top view of the fuel side of an interconnect 400 included in the stack 300, and FIG. 3D is a schematic view of a fuel cell included in the stack 300.

Referring to FIGS. 3A-3D, the fuel cell stack 300, which may also be referred to as a fuel cell column because it lacks ASP's, includes multiple fuel cells 310 that are separated by interconnects 400, which may also be referred to as gas flow separator plates or bipolar plates. One or more stacks 300 may be thermally integrated with other components of a fuel cell power generating system (e.g., one or more anode tail gas oxidizers, fuel reformers, fluid conduits and manifolds, etc.) in a common enclosure or "hotbox."

The interconnects 400 are made from an electrically conductive metal material. For example, the interconnects 400 may comprise a chromium alloy, such as a Cr—Fe alloy. The interconnects 400 may typically be fabricated using a powder metallurgy technique that includes pressing and sintering a Cr—Fe powder, which may be a mixture of Cr and Fe powders or an Cr—Fe alloy powder, to form a Cr—Fe interconnect in a desired size and shape (e.g., a "net shape" or "near net shape" process). A typical chromium-alloy interconnect 400 comprises more than about 90% chromium by weight, such as about 94-96% (e.g., 95%) chromium by weight. An interconnect 400 may also contain less than about 10% iron by weight, such as about 4-6% (e.g., 5%) iron by weight, may contain less than about 2% by weight, such as about zero to 1% by weight, of other materials, such as yttrium or yttria, as well as residual or unavoidable impurities.

Each fuel cell 310 may include a solid oxide electrolyte 312, an anode 314, and a cathode 316. In some embodiments, the anode 314 and the cathode 316 may be printed on the electrolyte 312. In other embodiments, a conductive layer 318, such as a nickel mesh, may be disposed between the anode 314 and an adjacent interconnect 400. The fuel cell 310 does not include through-holes, such as the fuel holes of conventional fuel cells. Therefore, the fuel cell 310 avoids cracks that may be generated due to the presence of such through-holes.

An upper most interconnect 400 and a lowermost interconnect 400 of the stack 300 may be different ones of an air end plate or fuel end plate including features for providing air or fuel, respectively, to an adjacent end fuel cell 310. As used herein, an "interconnect" may refer to either an interconnect located between two fuel cells 310 or an end plate located at an end of the stack and directly adjacent to only one fuel cell 310. Since the stack 300 does not include ASPs and the end plates associated therewith, the stack 300 may include only two end plates. As a result, stack dimensional variations associated with the use of intra-column ASPs may be avoided.

The stack 300 may include side baffles 302, a fuel plenum 350, and a compression assembly 306. The side baffles 302 may be formed of a ceramic material and may be disposed on opposing sides of the fuel cell stack 300 containing stacked fuel cells 310 and interconnects 400. The side baffles 302 may connect the fuel plenum 350 and the compression assembly 306, such that the compression assembly 306 may apply pressure to the stack 300. The side baffles 302 may be curved baffle plates, such each baffle plate covers at least portions of three sides of the fuel cell stack 300. For example, one baffle plate may fully cover the fuel inlet riser side of the stack 300 and partially covers the adjacent front and back sides of the stack, while the other baffle plate fully covers the fuel outlet riser side of the stack and partially covers the adjacent portions of the front and back sides of the stack. The remaining uncovered portions for the front and back sides of the stack allow the air to flow through the stack 300. The curved baffle plates provide an improved air flow control through the stack compared to the conventional baffle plates 38 which cover only one side of the stack. The fuel plenum 350 may be disposed below the stack 300 and may be configured to provide a hydrogen-containing fuel feed to the stack 300, and may receive an anode fuel exhaust from the stack 300. The fuel plenum 350 may be connected to fuel inlet and outlet conduits 320 which are located below the fuel plenum 350.

Each interconnect 400 electrically connects adjacent fuel cells 310 in the stack 300. In particular, an interconnect 400 may electrically connect the anode electrode of one fuel cell 310 to the cathode electrode of an adjacent fuel cell 310. As shown in FIG. 3C, each interconnect 400 may be configured to channel air in a first direction A, such that the air may be provided to the cathode of an adjacent fuel cell 310. Each interconnect 400 may also be configured to channel fuel in a second direction F, such that the fuel may be provided to the anode of an adjacent fuel cell 310. Directions A and F may be perpendicular, or substantially perpendicular. As such, the interconnects 400 may be referred to as cross-flow interconnects.

The interconnect 400 may include fuel holes that extend through the interconnect 400 and that are configured for fuel distribution. For example, the fuel holes may include one or more fuel inlets 402 and one or more fuel (e.g., anode exhaust) outlets 404, which may also be referred to as anode exhaust outlets 404. The fuel inlets and outlets 402, 404 may be disposed outside of the perimeter of the fuel cells 310. As such, the fuel cells 310 may be formed without corresponding through-holes for fuel flow. The combined length of the fuel inlets 402 and/or the combined length of the fuel outlets 404 may be at least 75% of a corresponding length of the interconnect 400 e.g., a length taken in direction A.

In one embodiment, each interconnect 400 contains two fuel inlets 402 separated by a neck portion 412 of the interconnect 400, as shown in FIG. 3B. However, more than two fuel inlets 402 may be included, such as three to five inlets separated by two to four neck portions 412. In one embodiment, each interconnect 400 contains two fuel outlets 404 separated by a neck portion 414 of the interconnect 400, as shown in FIG. 3B. However, more than two fuel outlets 404 may be included, such as three to five outlets separated by two to four neck portions 414.

The fuel inlets 402 of adjacent interconnects 400 may be aligned in the stack 300 to form one or more fuel inlet risers 403. The fuel outlets 404 of adjacent interconnects 400 may be aligned in the stack 300 to form one or more fuel outlet risers 405. The fuel inlet riser 403 may be configured to distribute fuel received from the fuel plenum 350 to the fuel cells 310. The fuel outlet riser 405 may be configured to provide anode exhaust received from the fuel cells 310 to the fuel plenum 350.

Unlike the flat related art side baffles 38 of FIG. 1A, the side baffles 302 may be curved around edges of the interconnects 400. In particular, the side baffles 302 may be disposed around the fuel inlets 402 and outlets 404 of the interconnects 400. Accordingly, the side baffles may more efficiently control air flow through air channels of the interconnects 400, which are exposed between the side baffles 302 and are described in detail with regard to FIGS. 4A and 4B.

In various embodiments, the stack 300 may include at least 30, at least 40, at least 50, or at least 60 fuel cells, which may be provided with fuel using only the fuel risers 403, 405. In other words, as compared to a conventional fuel cell system, the cross-flow configuration allows for a large number of fuel cells to be provided with fuel, without the need for ASP's or external stack fuel manifolds, such as external conduits 32, 34 shown in FIG. 1A.

Each interconnect 400 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 400 may comprise a metal (e.g., a chromium-iron alloy, such as 4-6 weight percent iron, optionally 1 or less weight percent yttrium and balance chromium alloy), and may electrically connect the anode or fuel-side of one fuel cell 310 to the cathode or air-side of an adjacent fuel cell 310. An electrically conductive contact layer, such as a nickel contact layer (e.g., a nickel mesh), may be provided between anode and each interconnect 400. Another optional electrically conductive contact layer may be provided between the cathode electrodes and each interconnect 400.

A surface of an interconnect 400 that in operation is exposed to an oxidizing environment (e.g., air), such as the cathode-facing side of the interconnect 400, may be coated with a protective coating layer in order to decrease the growth rate of a chromium oxide surface layer on the interconnect and to suppress evaporation of chromium vapor species which can poison the fuel cell cathode. Typically, the coating layer, which can comprise a perovskite such as lanthanum strontium manganite (LSM), may be formed using a spray coating or dip coating process. Alternatively, other metal oxide coatings, such as a spinel, such as an (Mn, Co)$_3$O$_4$ spinel (MCO), can be used instead of or in addition to LSM. Any spinel having the composition Mn$_{2-x}$Co$_{1+x}$O$_4$ ($0 \leq x \leq 1$) or written as $z(Mn_3O_4)+(1-z)(Co_3O_4)$, where ($\frac{1}{3} \leq z \leq \frac{2}{3}$) or written as (Mn, Co)$_3$O$_4$ may be used. In other embodiments, a mixed layer of LSM and MCO, or a stack of LSM and MCO layers may be used as the coating layer.

Figure 4A:
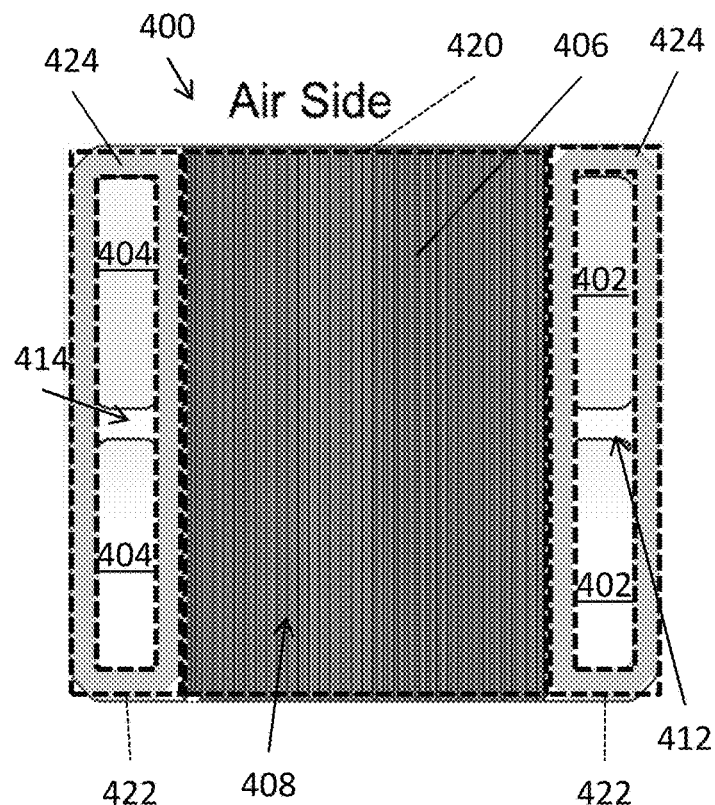
FIGS. 4A and 4B are plan views showing, respectively, an air side and a fuel side of the cross-flow interconnect of FIG. 3C, according to various embodiments of the present disclosure.
Figure 4B:
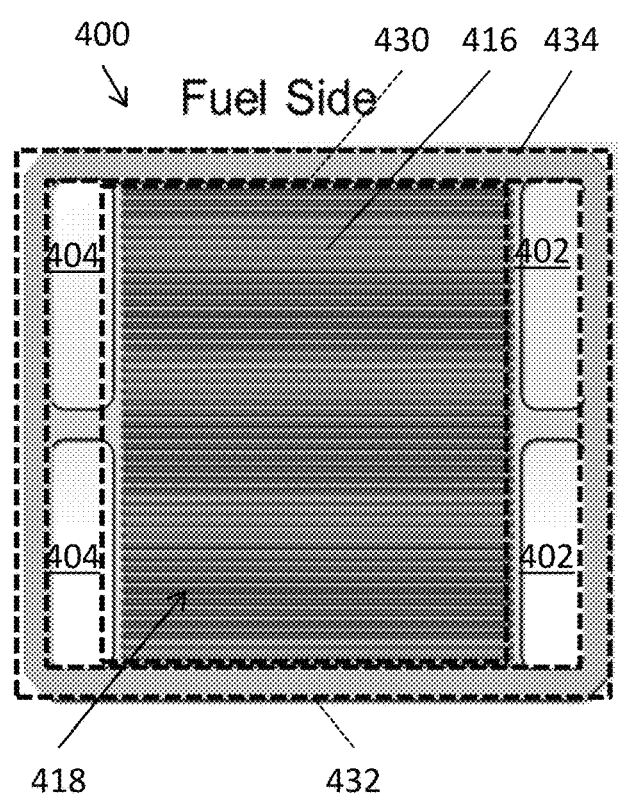

FIGS. 4A and 4B are plan views showing, respectively, an air side and a fuel side of the cross-flow interconnect 400, according to various embodiments of the present disclosure. Referring to FIG. 4A, the air side of the interconnect 400 may include ribs 406 configured to at least partially define air channels 408 configured to provide air to the cathode of a fuel cell 310 disposed thereon. The air side of the interconnect 400 may be divided into an air flow field 420 including the air channels 408, and riser seal surfaces 422 disposed on two opposing sides of the air flow field 420. One of the riser seal surfaces 422 may surround the fuel inlets 402 and the other riser seal surface 422 may surround the fuel outlets 404. The air channels 408 and ribs 406 may extend completely across the air side of the interconnect 400, such that the air channels 408 and ribs 406 terminate at opposing peripheral edges of the interconnect 400. In other words, when assembled into a stack 300, opposing ends of the air channels 408 and ribs 406 are disposed on opposing (e.g., front and back) outer surfaces of the stack, to allow the blown air to flow through the stack. Therefore, the stack may be externally manifolded for air.

Riser seals 424 may be disposed on the riser seal surface 422. For example, one riser seal 424 may surround the fuel inlets 402, and one riser seal 424 may surround the fuel outlets 404. The riser seals 424 may prevent fuel and/or anode exhaust from entering the air flow field 420 and contacting the cathode of the fuel cell 310. The riser seals 424 may also operate to prevent fuel from leaking out of the fuel cell stack 100 (see FIG. 3A).

Referring to FIG. 4B, the fuel side of the interconnect 400 may include ribs 416 that at least partially define fuel channels 418 configured to provide fuel to the anode of a fuel cell 310 disposed thereon. The fuel side of the interconnect 400 may be divided into a fuel flow field 430 including the fuel channels 418, and a perimeter seal surface 432 surrounding the fuel flow field 430 and the fuel inlets and outlets 402, 404. The ribs 416 and fuel channels 418 may extend in a direction that is perpendicular or substantially perpendicular to the direction in which the air-side channels 408 and ribs 406 extend.

A frame-shaped perimeter seal 434 may be disposed on the perimeter seal surface 432. The perimeter seal 434 may be configured to prevent air entering the fuel flow field 430 and contacting the anode on an adjacent fuel cell 310. The perimeter seal 434 may also operate to prevent fuel from exiting the fuel risers 403, 405 and leaking out of the fuel cell stack 300 (see FIGS. 3A and 3B).

The seals 424, 434 may comprise a glass or ceramic seal material. The seal material may have a low electrical conductivity. In some embodiments, the seals 424, 434 may be formed by printing one or more layers of seal material on the interconnect 400, followed by sintering.

Fuel Flow Structures

As shown in FIG. 1A, in a conventional fuel cell system, fuel and fuel exhaust are provided to and received from a fuel cell stack through metal anode splitter plates 36. The anode splitter plates 36 which are fluidly connected to one another by the fuel inlet conduit 32 and the anode exhaust conduit 34. The conduits 32, 34 include metal tubes that are welded to the anode splitter plates 36 and to ceramic components that serve as dielectric breaks. As such, fluidly connecting the anode splitter plates 36 relies upon expensive dielectric components and a significant amount of on-site welding. Therefore, there is a need for a more cost effective method for providing fuel to, and receiving fuel exhaust from, a fuel cell stack.

Figure 5A:
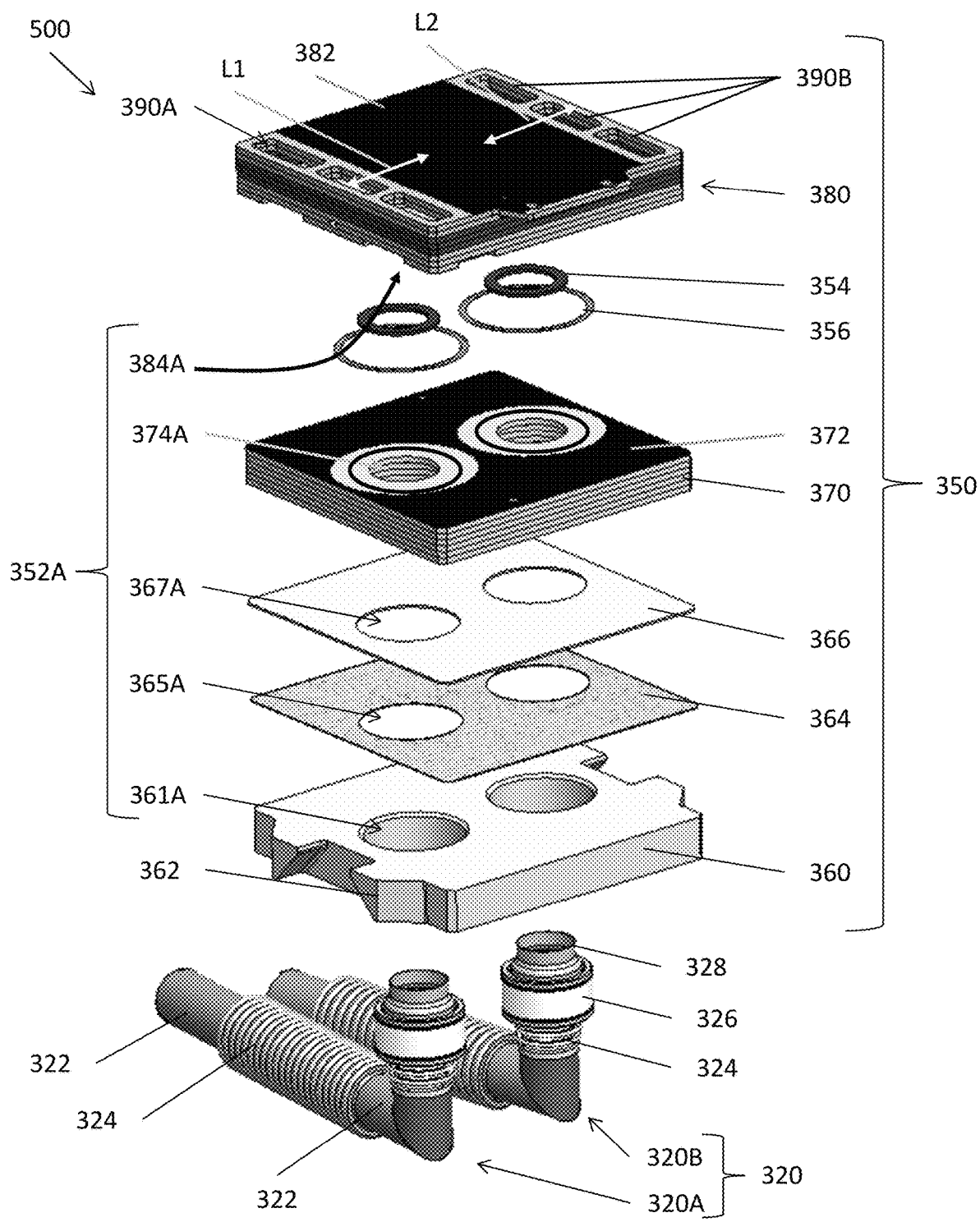
FIG. 5A is an exploded top perspective view of a fuel flow structure, according to various embodiments of the present disclosure.
Figure 5B:
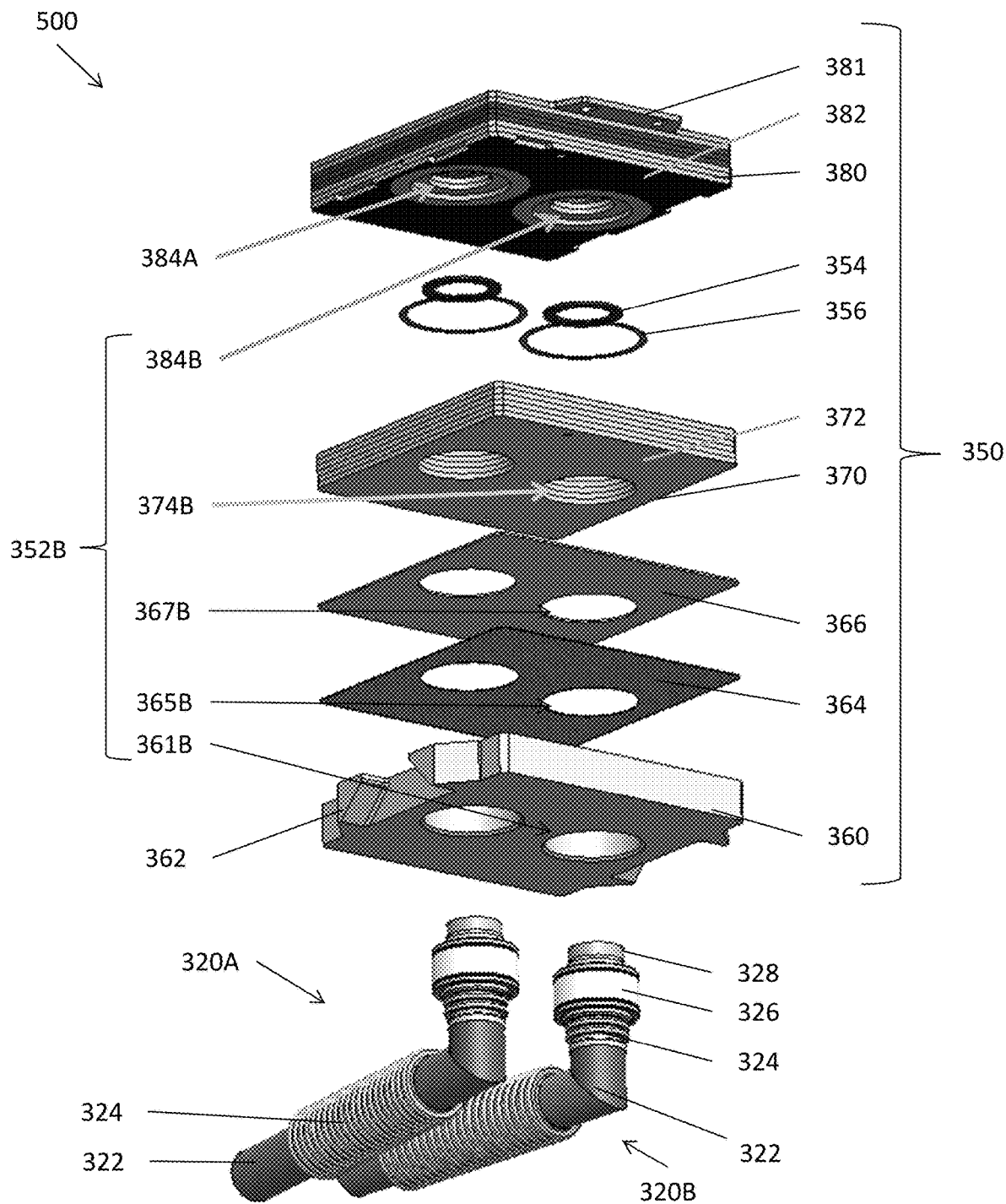
FIG. 5B is an exploded bottom perspective view of the fuel flow structure of FIG. 5A.

FIG. 5A is an exploded top perspective view of a fuel flow structure 500, according to various embodiments of the present disclosure, and FIG. 5B is an exploded bottom perspective view of the fuel flow structure 500 of FIG. 5A. Referring to FIGS. 5A and 5B, the fuel flow structure 500 includes fuel conduits 320 and a fuel plenum 350. The fuel plenum 350 may include a seal ring 354, glass or glass ceramic seals 356, a base plate 360, a dielectric layer 364, a cover plate 366, a seal plate 370, and a manifold plate 380.

The fuel plenum 350 may be configured to form a fluid-tight connection with the fuel conduits 320. The fuel conduits 320 may include an inlet conduit 320A configured to provide fuel to the fuel plenum 350, and an outlet conduit 320B configured to receive fuel exhaust from the fuel plenum 350. The fuel conduits 320 may include metal tubes 322, metal bellows 324, and dielectric rings 326. The metal tubes 322 may be coupled to the bellows 324 and the dielectric rings 326 by brazing, welding, or press-fitting, for example. The bellows 324 may act to compensate for differences in coefficients of thermal expansion between fuel cell components by deforming to absorb stress. In alternate embodiments, the metal tubes 322 may themselves include, or be made entirely of bellows, rather than be coupled with the bellows 324 such that the metal tubes/bellows 322 may be directly coupled with the dielectric ring 326. The dielectric rings 326 may operate as dielectric breaks, to prevent current from being conducted through the fuel conduits 320 and electrically shorting a fuel cell stack disposed on the fuel plenum 350.

The base plate 360, dielectric layer 364, and cover plate 366 may respectively include inlet holes 361A, 365A, 367A and outlet holes 361B, 365B, 367B, which may be through-holes that extend through the respective plates and layer. The base plate 360 may include protrusions 362 configured to mate with ceramic connectors 39, as shown in FIG. 1A. The base plate 360 and the cover plate 366 may be formed of a densified dielectric material. For example, the base plate 360 and the cover plate 366 may be formed of a substantially non-porous, electrically-insulating ceramic material, such as alumina, zirconia, yttria stabilized zirconia (YSZ) (e.g., 3% yttria stabilized zirconia), or the like. The base plate 360 and the cover plate 366 may be rigid plates configured to provide support to the dielectric layer 364.

In some embodiments, the dielectric layer 364 may be formed of a ceramic material having a higher dielectric constant than the ceramic materials of the base plate 360 and/or the cover plate 366. In other words, the dielectric layer 364 may be able to withstand a higher maximum electric field without electrical breakdown and becoming electrically conductive (i.e., have a higher breakdown voltage) than the base plate 360 and the cover plate 366. For example, the dielectric layer 364 may be formed of one or more layers of a porous ceramic yarn or fabric that is highly electrically insulating at high temperatures, such as Nextel ceramic fabrics numbers 312, 440 or 610, available from 3M Co.

In other embodiments, the dielectric layer 364 may be formed of a ceramic matrix composite (CMC) material, or any comparable material that has high dielectric strength, due to having a high surface area to volume ratio. The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. In one embodiment, both matrix and fibers may comprise alumina. Accordingly, the dielectric layer 364 may be configured to operate as a dielectric break to prevent electrical conduction through the fuel plenum 350.

The cover plate 366 and the base plate 360 may have a higher density than the dielectric layer 364. For example, the cover plate 366 and/or the base plate 360 may be formed of a fully dense ceramic material, such as 97% to 99.5% dense alumina, or the like. The cover plate 366 is configured to separate the seal plate 370 from the dielectric layer 364. As such, the cover plate 366 may be configured to prevent the diffusion of metallic species from the seal plate 370 into the dielectric layer 364. For example, the cover plate 366 may reduce and/or prevent the diffusion of chromium species (e.g., chromium oxides) from the seal plate 370 into the dielectric layer 364, in order to prevent the chromium species from reducing the dielectric strength of the dielectric layer 364 and/or otherwise degrading the structural integrity of the dielectric layer 364.

The seal plate 370 and the manifold plate 380 may be formed of a metal or metal alloy, such as stainless steel, that may be easily welded to the fuel conduits 320. For example, the seal plate 370 and/or the manifold plate 380 may be formed of 446 stainless steel or the like. 446 stainless steel includes 23 to 27 weight % Cr, 1.5 weight % or less Mn, 1 weight % or less of one or more of Si, Ni, C, P and/or S, and balance Fe. In some embodiments, the seal plate 370 and/or the manifold plate 380 may be formed by brazing multiple metal sub-plates together. In embodiments formed using metal sub-plates, each of the sub-plates may be cut to form various structures, such as holes and/or channels, prior to, or after, the brazing process. In some embodiments, laser cutting or the like may be used to cut such structures.

The seal plate 370 and the manifold plate 380 may respectively include coatings 372, 382 on one or both sides, such as at least on the sides of the plates 370, 380 that face each other. The coatings 372, 382 may have a thickness ranging from about 75 μm to about 200 μm, such as from about 100 μm to about 175 μm, from about 110 μm to about 140 μm, or about 120 μm. Typically, the coatings 372, 382 may comprise a metal oxide material, such as a perovskite material, for example, lanthanum strontium manganite (LSM). Alternatively, other metal oxide coatings, such as a spinel, such as an $(Mn, Co)_3O_4$ spinel (MCO), can be used instead of or in addition to LSM. Any spinel having the composition $Mn_{2-x}Co_{1+x}O_4$ (0≤x≤1) or written as $z(Mn_3O_4)+(1-z)(Co_3O_4)$, where (⅓≤z≤⅔) or written as $(Mn, Co)_3O_4$ may be used. In other embodiments, a mixed layer of LSM and MCO, or a stack of LSM and MCO layers may be used as the coatings 372, 382. The coatings 372, 382 may be formed using a spray coating or dip coating process and may be applied to substantially all the outer surfaces of the seal plate 370 and the manifold plate 380.

The seal plate 370 may include an inlet hole 374A and an outlet hole 374B, which may be through-holes that extend between top and bottom surfaces thereof. The manifold plate 380 may include a bottom inlet hole 384A and a bottom outlet hole 384B formed in the bottom surface thereof, and top inlet holes 390A and top outlet holes 390B, which may be formed in the top surface thereof, on opposing sides of the manifold plate 380. While three top inlet holes 390A and three top outlet holes 390B are shown, the present disclosure is not limited to any particular number of top outlet and inlet holes 390A, 390B. For example, the manifold plate 380 may include two, four, five or more top inlet holes 390A, and may include two, four, five or more top outlet holes 390B, depending on a number of fuel inlets and outlets included in the interconnects 400 of a corresponding fuel cell stack. For example, if the interconnects has three inlets and three outlets, then the manifold plate 380 has three inlet holes 390A and three outlet holes 390B.

The base plate 360, dielectric layer 364, cover plate 366, seal plate 370, and manifold plate 380 may be stacked on one another, such that the inlet holes 361A, 365A, 367A, 374A, 384A are aligned to form an inlet conduit passage 352A, and the outlet holes 361B, 365B, 367B, 374B, 384B are aligned to form an outlet conduit passage 352B. The inlet and outlet conduits 320A, 320B may be inserted into the respective inlet and outlet conduit passages 352A, 352B such that ends 328 of the inlet and outlet conduits 320A, 320B may extend up to and/or past the upper surface of the seal plate 370.

Figure 6A:
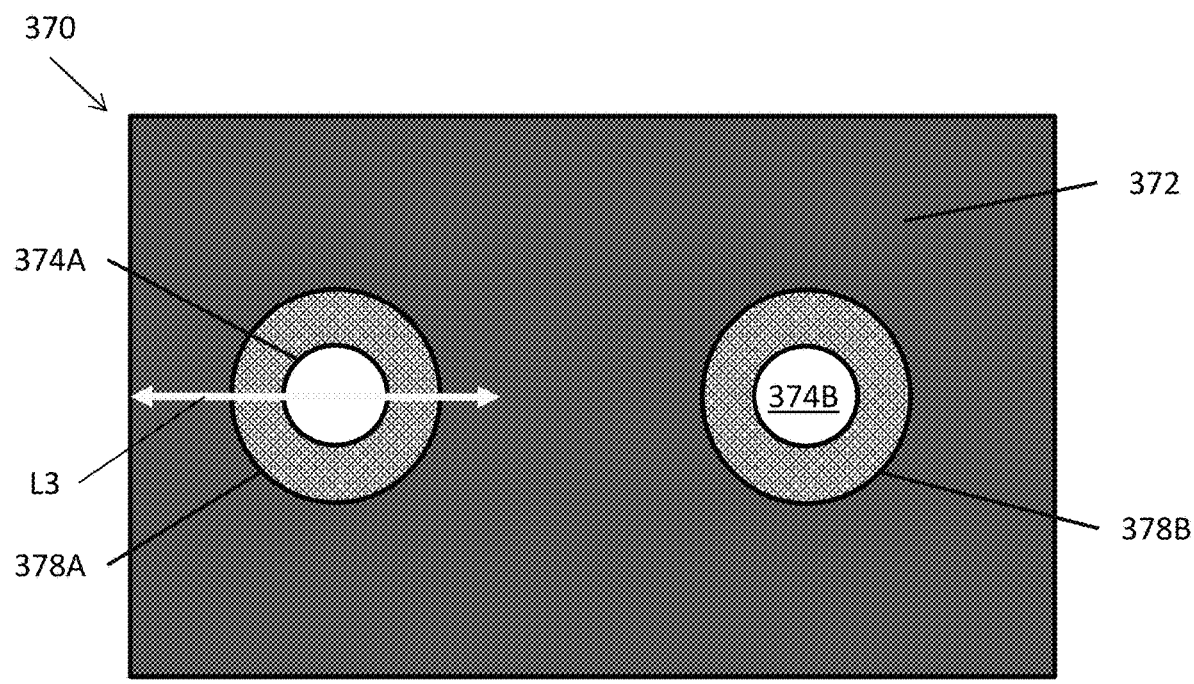
FIG. 6A is a top view of a seal plate of FIGS. 5A and 5B.
Figure 6B:
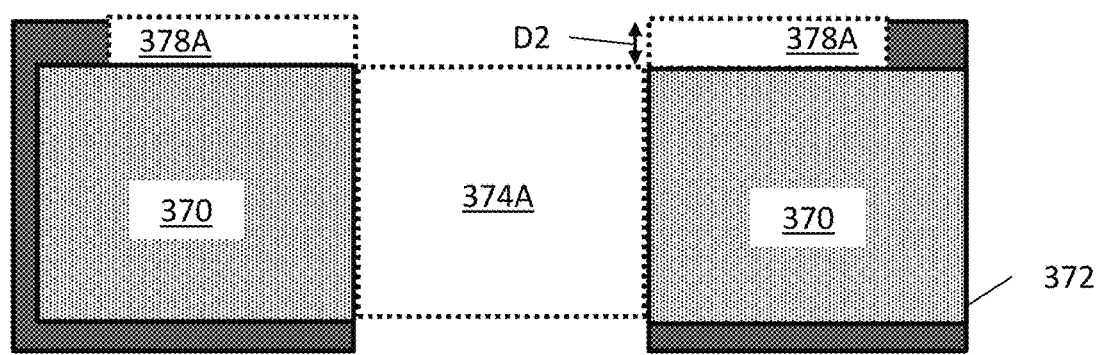
FIG. 6B is a cross-sectional view taken along line L3 of FIG. 6A.

FIG. 6A is a top view of the seal plate 370, and FIG. 6B is a cross-sectional view taken along line L3 of FIG. 6A.

An inlet seal region 378A and an outlet seal region 378B may be respectively formed around the inlet hole 374A and an outlet hole 374B in areas where the coating 372 is not applied to the top surface of the seal plate 370. As such, the inlet and outlet seal regions 378A, 378B may have a depth D2 equal to the thickness of the coating 372, such as a depth D2 of about 120 µm.

Figure 7A:
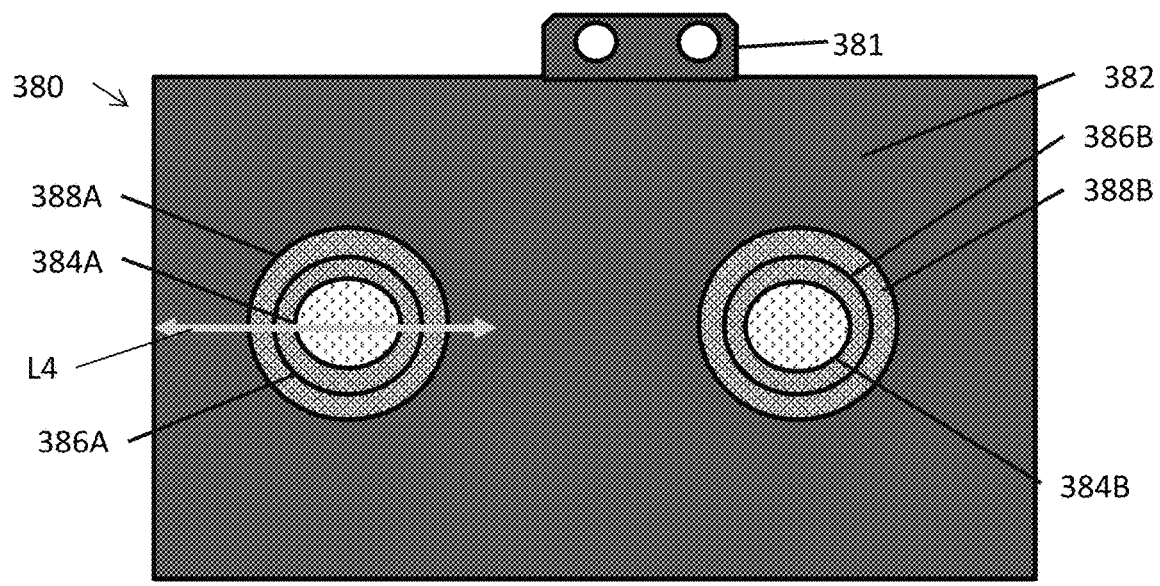
FIG. 7A is a bottom view of a manifold plate of FIGS. 5A and 5B.
Figure 7B:
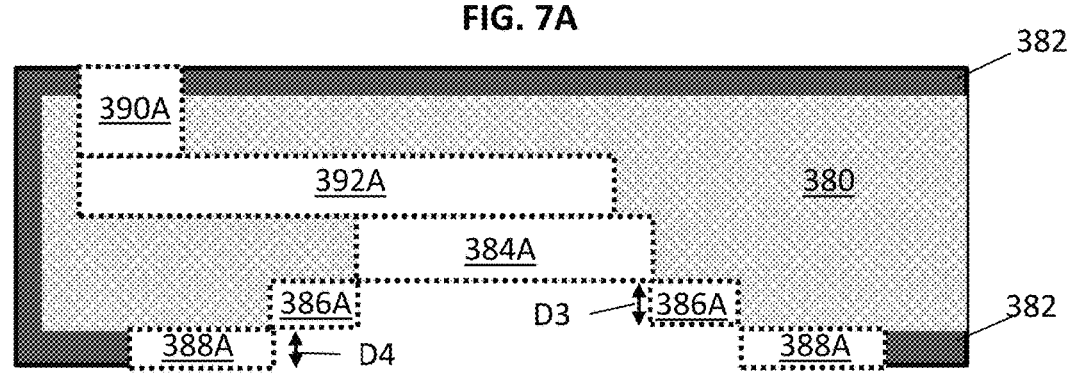
FIG. 7B is a cross-sectional view taken along line L4 of FIG. 7A.
Figure 7C:
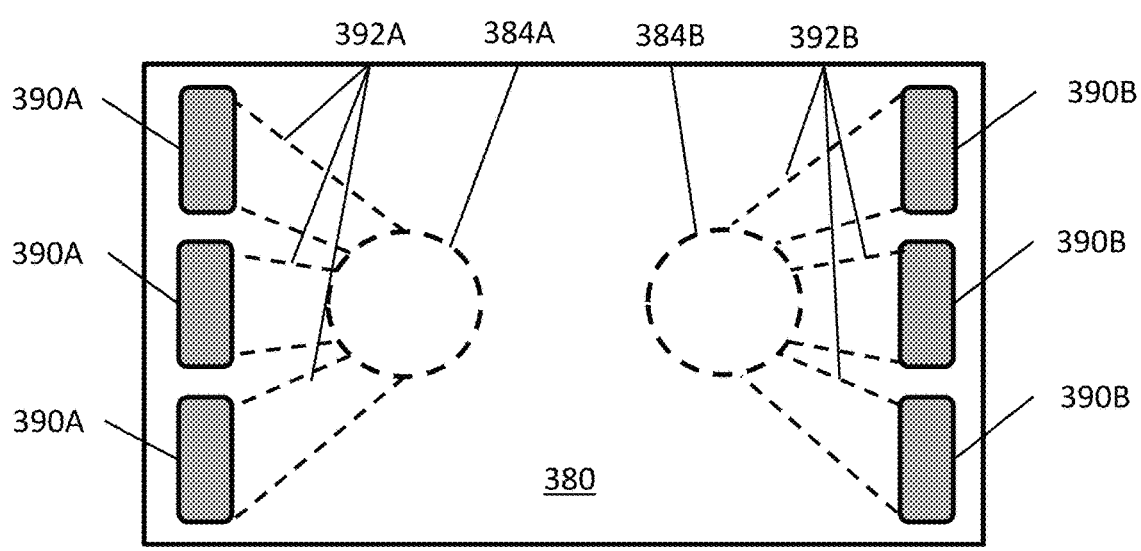
FIG. 7C is a schematic top view of the manifold plate of FIG. 7A.

FIG. 7A is a bottom view of the manifold plate 380, FIG. 7B is a cross-sectional view taken along line L4 of FIG. 7A, and FIG. 7C is a schematic top view of the manifold plate 380, according to various embodiments of the present disclosure. Referring to FIGS. 7A-7C, inlet and outlet recesses 386A, 386B may be formed in the bottom surface of the manifold plate 380, respectively surrounding the bottom inlet and outlet holes 384A, 384B. The inlet and outlet recesses 386A, 386B may have a depth D3 ranging from about 0.5 mm to about 6 mm.

Inlet and outlet seal regions 388A, 388B may be respectively formed around the inlet and outlet recesses 386A, 386B, in areas where the coating 382 is not applied to the bottom surface of the manifold plate 380. As such, the inlet and outlet seal regions 388A, 388B may have a depth D4 equal to the thickness of the coating 382, such as a depth D4 of about 120 µm.

The manifold plate 380 may also include internal inlet channels 392A and outlet channels 392B. The inlet channels 392A may fluidly connect the bottom inlet hole 384A to respective top inlet holes 390A. The outlet channels 392B may fluidly connect the bottom outlet hole 384B to respective top outlet holes 390B. The inlet channels 392A may be configured such that substantially equal amounts of fuel (e.g., equal fuel flow rates) are provided to each top inlet hole 390A from the common bottom inlet hole 384A. The outlet channels 392B may be configured such that substantially equal amounts of fuel exhaust are provided from each top outlet hole 390B to the common bottom outlet hole 384B.

In addition, the manifold plate 380 may include an electrical contact 381. The manifold plate 380 may be electrically connected to the bottom of a fuel cell stack, and the electrical contact 381 may extend laterally from the manifold plate 380 and may be configured to provide a connection point for connecting the manifold plate 380 to a current collection circuit.

Figure 8A:
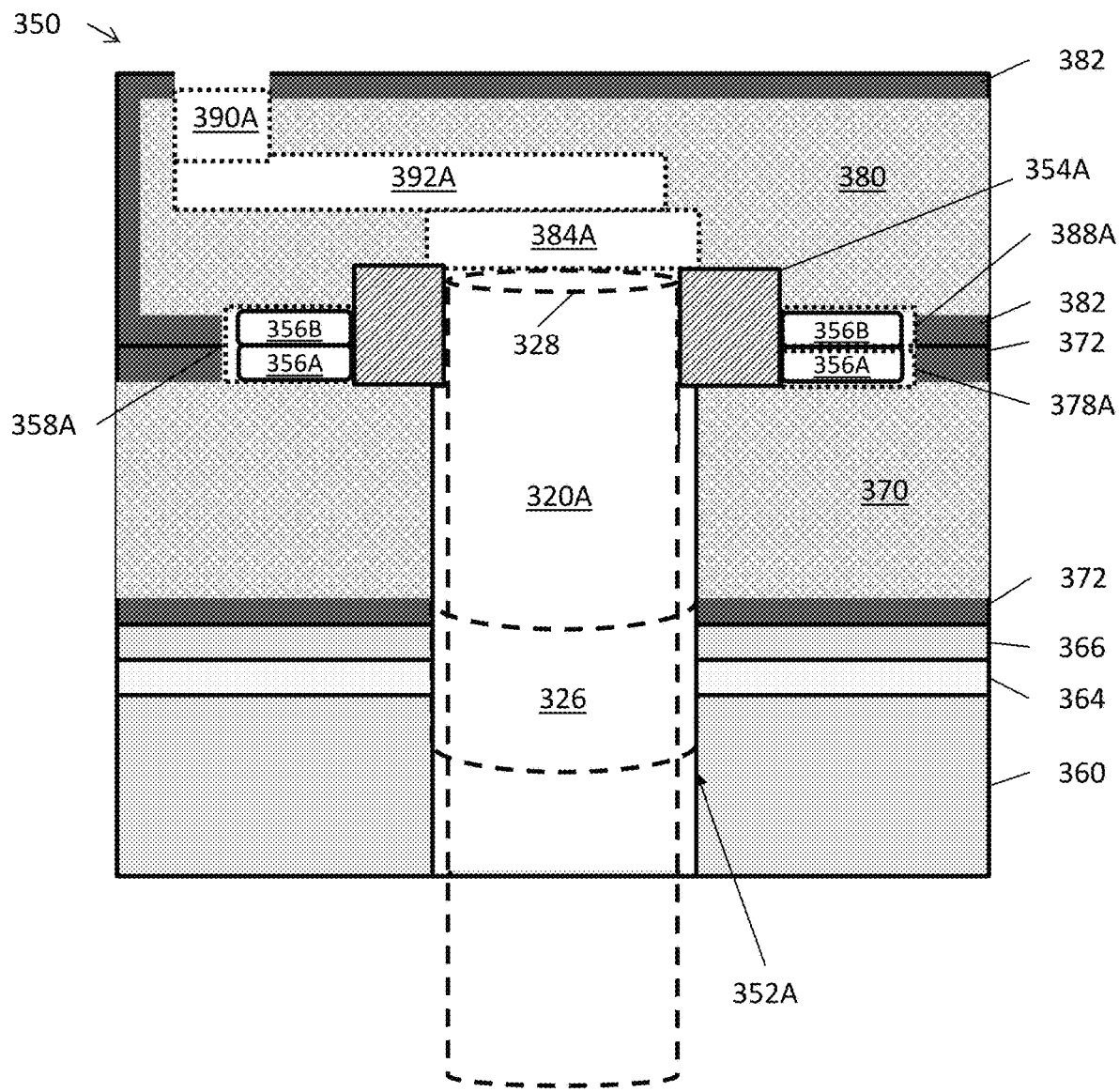
FIG. 8A is a vertical cross-sectional view taken along line L1 of FIG. 5A, showing an assembled fuel plenum and inlet conduit.
Figure 8B:
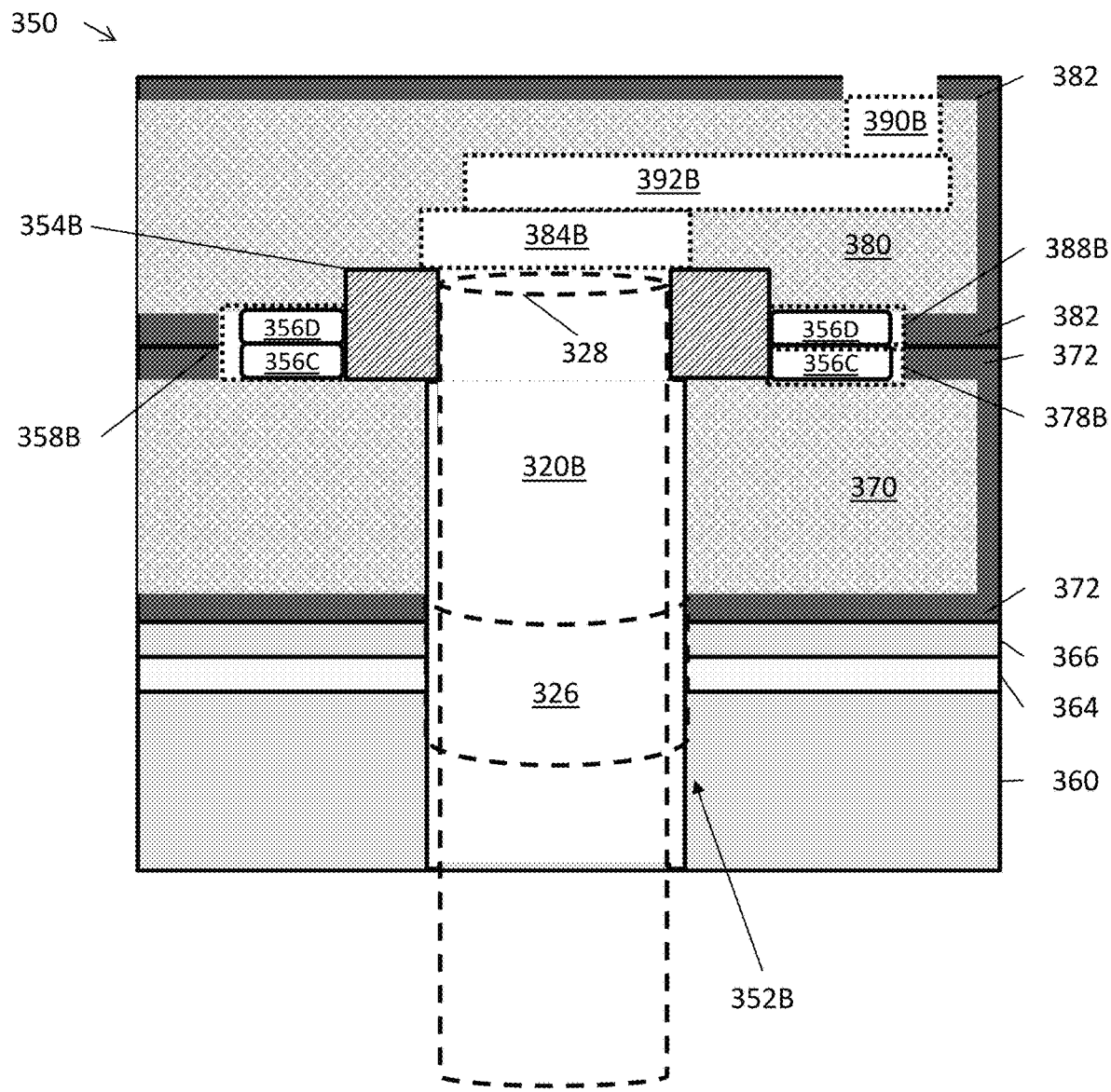
FIG. 8B is a vertical cross-sectional view or along line L2 of FIG. 5A, showing the assembled fuel plenum and outlet conduit.

FIG. 8A is a vertical cross-sectional view taken along line L1 of FIG. 5A, showing the assembled fuel plenum 350 and inlet conduit 320A, and FIG. 8B is a vertical cross-sectional view or along line L2 of FIG. 5A, showing the assembled fuel plenum 350 and outlet conduit 320B.

Referring to FIGS. 5A, 5B, 8A, and 8B, the base plate 360, dielectric layer 364, cover plate 366, seal plate 370, and manifold plate 380 are stacked on one another, thereby forming the inlet conduit passage 352A and the outlet conduit passage 352B. The inlet conduit 320A may be inserted in the inlet conduit passage 352A, facing the bottom inlet hole 384A. The outlet conduit 320B may be inserted in the outlet conduit passage 352B, facing the bottom outlet hole 384B.

A first seal ring 354A may be disposed in the inlet recess 386A on the bottom surface of the manifold plate 380 and around the inlet conduit 320A. A second seal ring 354B may be disposed in the outlet recess 386B on the bottom surface of the manifold plate 380 and around the outlet conduit 320B. The inlet and outlet conduits 320A, 320B may be welded to the seal plate 370. In particular, the welding process may include welding the first and second seal rings 354A, 354B to the inlet and outlet conduits 320A, 320B, and welding the first and second seal rings 354A, 354B to the surface of the seal plate 370 to ensure that a fluid-tight seal is formed between the inlet and outlet conduits 320A, 320B and the seal plate 370.

A first glass or glass ceramic seal 356A may be disposed in the inlet seal region 378A of the seal plate 370, and a second glass or glass ceramic seal 356B may be disposed in the inlet seal region 388A of the manifold plate 380. A third glass or glass ceramic seal 356C may be disposed in the outlet seal region 378B of the seal plate 370, and a fourth glass or glass ceramic seal 356D may be disposed in the outlet seal region 388B of the manifold plate 380. However, in other embodiments, a single glass or glass ceramic seal may be used. The seals 356A-356D may be heated to soften the seals 356A-356D, such that the seals 356A-356D form a fluid-tight connections that physically connect the seal plate 370 to the manifold plate 380.

The inlet seal regions 378A, 388A may overlap to form an inlet seal area 358A, and the outlet seal regions 378B, 388B may overlap to form an outlet seal area 358B. The first and second seals 356A, 356B may be stacked on one another in the inlet seal area 358A, and the third and fourth seals 356C, 356D may be stacked on one another in the outlet seal area 358B. The coatings 372, 382 may be stacked on one another. As such, the height of the inlet and outlet seal areas 358A, 358B may be equal to the combined thickness of the coatings 372, 382.

The inlet and outlet seal areas 358A, 358B may provide space for the glass or glass ceramic seals 356A-356D to expand laterally when heated to fuel cell system operating temperatures, thereby reducing stress applied to the glass or glass ceramic seals 356A-356D over time. In addition, since the seal plate 370 and the manifold plate 380 may be formed of the same materials, the seal plate 370 and the manifold plate 380 may have matched coefficients of thermal expansion (CTEs). Therefore, stress applied to the glass or glass ceramic seals 356A-356D over time may be further reduced.

The glass or glass ceramic seals 356A-356D may be formed of a high-temperature glass or glass ceramic material, such as a silicate or aluminosilicate glass or glass ceramic material. In some embodiments, the glass or glass ceramic seals 356A-356D may be formed of a silicate glass or glass ceramic seal material comprising $SiO_2$, BaO, CaO, $Al_2O_3$, $K_2O$, and/or $B_2O_3$. For example, the seal material may include, by weight: $SiO_2$ in an amount ranging from about 40% to about 60%, such as from about 45% to about 55%; BaO in an amount ranging from about 10% to about 35%, such as from about 15% to about 30%; CaO in an amount ranging from about 5% to about 20%, such as from about 7% to about 16%; $Al_2O_3$ in an amount ranging from about 10% to about 20%, such as from about 13% to about 15%; and $B_2O_3$ in an amount ranging from about 0.25% to about 7%, such as from about 0.5% to about 5.5%. In some embodiments, the seal material may additionally include $K_2O$ in an amount ranging from about 0.5% to about 1.5%, such as from about 0.75% to about 1.25%.

In some embodiments, the glass or glass ceramic seals 356A-356D may be formed of a silicate glass or glass ceramic seal material comprising $SiO_2$, $B_2O_3$, $Al_2O_3$, CaO, MgO, $La_2O_3$, BaO, and/or SrO. For example, the seal material may include, by weight: $SiO_2$ in an amount ranging from about 30% to about 60%, such as from about 35% to about 55%; $B_2O_3$ in an amount ranging from about 0.5% to about 15%, such as from about 1% to about 12%; $Al_2O_3$ in an amount ranging from about 0.5% to about 5%, such as from about 1% to about 4%; CaO in an amount ranging from about 2% to about 30%, such as from about 5% to about 25%; MgO in an amount ranging from about 2% to about 25%, such as from about 5% to about 20%; and $La_2O_3$ in an amount ranging from about 2% to about 12%, such as from about 5% to about 10%. In some embodiments, the seal material may additionally include BaO in an amount ranging from about 0% to about 35%, such as from about 0% to about 30%, or from about 0.5% to about 30%, including about 20% to about 30%, and/or SrO in an amount ranging from about 0% to about 20%, such as from about 0% to about 15%, of from about 0.5% to about 15%, including about 10% to about 15%. In some embodiments, the seal material may additionally include at least one of BaO and/or SrO in a non-zero amount such as at least 0.5 wt. %, such as both of BaO and SrO in a non-zero amount, such at least 0.5 wt. %. However, other suitable seal materials may be used.

When assembled in a fuel cell stack, such as the fuel cell stack 300 of FIGS. 3A-3C, the top inlet holes 390A may be fluidly connected to the fuel inlets 402 of the interconnect 400 of the stack 300, and the top outlet holes 390B may be fluidly connected to the fuel outlets 404 of the interconnects 400, as shown in FIG. 4A. For example, a glass or glass ceramic seal 424 may be disposed between the top inlet holes 390A and the fuel inlets 402 of an adjacent interconnect 400, and a glass or glass ceramic seal 424 may be disposed between the top outlet holes 390B and the fuel outlets 404 of the adjacent interconnect 400, in order to provide fluid-tight connections.

While solid oxide fuel cells are described above in various embodiments, embodiments can include any other fuel cells, such as molten carbonate, phosphoric acid or PEM fuel cells.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step or component of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell stack fuel flow structure comprising a fuel plenum that comprises:
a base plate comprising an inlet hole and an outlet hole;
a dielectric layer disposed on the base plate and comprising an inlet hole and an outlet hole;
a cover plate disposed on the dielectric layer and comprising an inlet hole and an outlet hole;
a seal plate disposed on the cover plate and comprising an inlet hole and an outlet hole; and
a manifold plate disposed on the seal plate and comprising:
a bottom inlet hole and a bottom outlet hole formed in a bottom surface of the manifold plate;
top outlet holes and top inlet holes formed in opposing sides of a top surface of the manifold plate;
outlet channels fluidly connecting the top outlet holes to the bottom inlet hole; and
inlet channels fluidly connecting the top inlet holes to the bottom outlet hole,
wherein the inlet holes of the base plate, cover plate, seal plate and manifold plate are aligned to form an inlet conduit passage,
wherein the outlet holes of the base plate, cover plate, seal plate and manifold plate are aligned to form an outlet conduit passage, and
wherein the dielectric layer comprises a ceramic matrix composite material having a higher dielectric strength than the cover plate and the base plate, or the seal plate and the manifold plate comprise a stainless steel material containing 23 to 27 weight percent chromium.

2. The fuel flow structure of claim 1, further comprising:
an inlet conduit disposed in the inlet conduit passage and configured to provide fuel to the bottom inlet hole of the manifold plate; and
an outlet conduit disposed in the outlet conduit passage and configured to receive fuel exhaust from the bottom outlet hole of the manifold plate.

3. The fuel flow structure of claim 2, wherein the manifold plate comprises:
an inlet recess formed in the bottom surface of the manifold plate, surrounding the inlet hole of the manifold plate; and
an outlet recess formed in the bottom surface of the manifold plate, surrounding the outlet hole of the manifold plate.

4. The fuel flow structure of claim 3, wherein the fuel flow structure further comprises:
a first seal ring disposed in the inlet recess and welded to the inlet conduit and the seal plate; and
a second seal ring disposed in the outlet recess and welded to the outlet conduit and the seal plate.

5. The fuel flow structure of claim 4, further comprising:
a first coating covering the seal plate; and
a second coating covering the manifold plate.

6. The fuel flow structure of claim 5, wherein the first and second coatings comprise a metal oxide material and have a thickness ranging from about 75 μm to about 200 μm.

7. The fuel flow structure of claim 5, wherein the seal plate comprises:
an inlet seal area surrounding the inlet hole and exposed through the first coating; and
an outlet seal area surrounding the outlet hole and exposed through the first coating.

8. The fuel flow structure of claim 7, further comprising:
a first glass or glass ceramic seal disposed in the inlet seal area of the seal plate; and
a second glass or glass ceramic seal ring disposed in the outlet seal area of the seal plate, wherein the first and second glass or glass ceramic seals are configured to fluidly connect the seal plate and the manifold plate.

9. The fuel flow structure of claim 8, wherein:
the manifold plate comprises:
    an inlet seal area surrounding the inlet hole and exposed through the second coating; and
    an outlet seal area surrounding the outlet hole and exposed through the second coating;
the fuel flow structure further comprises:
    a third glass or glass ceramic seal disposed in the inlet seal area of the manifold plate; and
    a third seal ring disposed in the outlet seal area of the manifold plate; and
the third glass or glass ceramic seal is stacked on the first glass or glass ceramic seal, the fourth glass or glass ceramic seal is stacked on the second glass or glass ceramic seal, and the first, second, third, and fourth glass or glass ceramic seals are configured to fluidly connect the seal plate and the manifold plate.

10. The fuel flow structure of claim 2, wherein the inlet conduit and the outlet conduit each comprise metal tubes, a metal bellows, and a dielectric ring.

11. The fuel flow structure of claim 1, wherein the dielectric layer comprises the ceramic matrix composite material which has the higher dielectric strength than the cover plate and the base plate.

12. The fuel flow structure of claim 11, wherein the base plate and the cover plate comprise a ceramic material having a density ranging from about 97% to about 99.5%.

13. The fuel flow structure of claim 12, wherein base plate and the cover plate comprise alumina.

14. The fuel flow structure of claim 12, wherein the cover plate is configured to prevent chrome species from diffusing into the dielectric layer from the seal plate.

15. The fuel flow structure of claim 1, wherein the seal plate and the manifold plate comprise the stainless steel material containing 23 to 27 weight percent chromium.

16. The fuel flow structure of claim 15, wherein the seal plate and the manifold plate each comprise respective stainless steel sub-plates which are brazed to each other.

17. The fuel flow structure of claim 1, wherein:
the base plate comprises protrusions configured to mate with ceramic connectors of a fuel cell stack; and
the manifold plate comprises an electrical contact configured to provide a connection point for connecting the manifold plate to a current collection circuit.

18. A fuel cell stack comprising:
the fuel plenum of claim 1;
interconnects stacked on the fuel plenum; and
fuel cells disposed between the interconnects.

19. The fuel cell stack of claim 18, wherein:
the fuel cells comprise solid oxide fuel cells;
the top outlet holes are fluidly connected to fuel inlets of the interconnects; and
the top inlet holes are fluidly connected to fuel outlets of the interconnects.

20. The fuel cell stack of claim 19, further comprising:
an inlet conduit disposed in the inlet conduit passage and configured to provide fuel to the bottom inlet hole of the manifold plate; and
an outlet conduit disposed in the outlet conduit passage and configured to receive fuel exhaust from the bottom outlet hole of the manifold plate.

21. A fuel cell stack fuel flow structure comprising a fuel plenum that comprises:
a base plate comprising an inlet hole and an outlet hole;
a dielectric layer disposed on the base plate and comprising an inlet hole and an outlet hole;
a cover plate disposed on the dielectric layer and comprising an inlet hole and an outlet hole;
a seal plate disposed on the cover plate and comprising an inlet hole and an outlet hole; and
a manifold plate disposed on the seal plate and comprising:
    a bottom inlet hole and a bottom outlet hole formed in a bottom surface of the manifold plate;
    top outlet holes and top inlet holes formed in opposing sides of a top surface of the manifold plate;
    outlet channels fluidly connecting the top outlet holes to the bottom inlet hole; and
    inlet channels fluidly connecting the top inlet holes to the bottom outlet hole,
wherein:
the inlet holes of the base plate, cover plate, seal plate and manifold plate are aligned to form an inlet conduit passage;
the outlet holes of the base plate, cover plate, seal plate and manifold plate are aligned to form an outlet conduit passage;
the base plate comprises protrusions configured to mate with ceramic connectors of a fuel cell stack; and
the manifold plate comprises an electrical contact configured to provide a connection point for connecting the manifold plate to a current collection circuit.

22. A fuel cell stack fuel flow structure comprising a fuel plenum that comprises:
a base plate comprising an inlet hole and an outlet hole;
a dielectric layer disposed on the base plate and comprising an inlet hole and an outlet hole;
a cover plate disposed on the dielectric layer and comprising an inlet hole and an outlet hole;
a seal plate disposed on the cover plate and comprising an inlet hole and an outlet hole; and
a manifold plate disposed on the seal plate and comprising:
    a bottom inlet hole and a bottom outlet hole formed in a bottom surface of the manifold plate;
    top outlet holes and top inlet holes formed in opposing sides of a top surface of the manifold plate;
    outlet channels fluidly connecting the top outlet holes to the bottom inlet hole;
    inlet channels fluidly connecting the top inlet holes to the bottom outlet hole;
    an inlet recess formed in the bottom surface of the manifold plate, surrounding the inlet hole of the manifold plate; and
    an outlet recess formed in the bottom surface of the manifold plate, surrounding the outlet hole of the manifold plate,
wherein the inlet holes of the base plate, cover plate, seal plate and manifold plate are aligned to form an inlet conduit passage;
wherein the outlet holes of the base plate, cover plate, seal plate and manifold plate are aligned to form an outlet conduit passage; and
wherein the fuel flow structure further comprises:
    an inlet conduit disposed in the inlet conduit passage and configured to provide fuel to the bottom inlet hole of the manifold plate;
    an outlet conduit disposed in the outlet conduit passage and configured to receive fuel exhaust from the bottom outlet hole of the manifold plate;

a first seal ring disposed in the inlet recess and welded to the inlet conduit and the seal plate; and a second seal ring disposed in the outlet recess and welded to the outlet conduit and the seal plate.

\* \* \* \* \*